United States Patent
Cerny et al.

(10) Patent No.: US 10,733,691 B2
(45) Date of Patent: *Aug. 4, 2020

(54) FRAGMENT SHADERS PERFORM VERTEX SHADER COMPUTATIONS

(71) Applicant: Sony Interactive Entertainment Inc., Tokyo (JP)

(72) Inventors: Mark Evan Cerny, Los Angeles, CA (US); David Simpson, Los Angeles, CA (US); Jason Scanlin, Los Angeles, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,003

(22) Filed: Sep. 27, 2018

(65) Prior Publication Data

US 2019/0035050 A1 Jan. 31, 2019

Related U.S. Application Data

(63) Continuation of application No. 14/297,231, filed on Jun. 5, 2014, now Pat. No. 10,096,079.

(Continued)

(51) Int. Cl.
*G06T 1/20* (2006.01)
*G06T 1/60* (2006.01)
*G06T 15/00* (2011.01)

(52) U.S. Cl.
CPC .............. *G06T 1/20* (2013.01); *G06T 1/60* (2013.01); *G06T 15/005* (2013.01)

(58) Field of Classification Search
CPC ......... G06T 15/005; G06T 1/20; G06T 11/40; G06T 15/04; G06T 15/80
See application file for complete search history.

(56) References Cited

U.S. PATENT DOCUMENTS 6,717,577 B1  4/2004  Cheng et al.
7,009,615 B1  3/2006  Kilgard et al.
(Continued)

FOREIGN PATENT DOCUMENTS

CN   1684104 A   10/2005
CN   1825356 A    8/2006
(Continued)

OTHER PUBLICATIONS

"Automatic Pre-Tessellation Cullling." Hasselgren, John. ACM Transactions on Graphics. vol. 28, Issue 2. pp. 1-10.
(Continued)

*Primary Examiner* — Xiao M Wu
*Assistant Examiner* — Scott E Sonners
(74) *Attorney, Agent, or Firm* — JDI Patent; Joshua Isenberg; Robert Pullman

(57) ABSTRACT

Graphics processing may include implementing a vertex shader and a pixel shader with the GPU. Vertex indices output from a vertex shader may be written to a cache. The vertex indices written to the cache may be accessed with the pixel shader and vertex parameter values associated with the vertex indices may be accessed from a memory unit with the pixel shader. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

16 Claims, 7 Drawing Sheets

Related U.S. Application Data

(60) Provisional application No. 61/833,218, filed on Jun. 10, 2013.

(56) References Cited

U.S. PATENT DOCUMENTS

| | | | |
|---|---|---|---|
| 7,468,726 | B1 | 12/2008 | Wloka et al. |
| 7,552,316 | B2 | 6/2009 | Hussain |
| 7,599,975 | B1 | 10/2009 | Donovan et al. |
| 8,254,701 | B1 | 8/2012 | Diard |
| 8,542,247 | B1 | 9/2013 | Hakura et al. |
| 8,595,747 | B2 | 11/2013 | Iwamoto |
| 8,760,460 | B1 | 6/2014 | Kilgariff et al. |
| 2002/0196251 | A1 | 12/2002 | Duluk et al. |
| 2005/0122338 | A1 | 6/2005 | Hong et al. |
| 2006/0173610 | A1 | 8/2006 | Listle |
| 2007/0171219 | A1 | 7/2007 | Tsao |
| 2008/0204451 | A1 | 8/2008 | Im et al. |
| 2009/0182948 | A1 | 7/2009 | Jiao et al. |
| 2010/0302246 | A1 | 12/2010 | Jiao et al. |
| 2011/0063311 | A1 | 3/2011 | McCrary et al. |
| 2011/0102448 | A1 | 5/2011 | Hakura et al. |
| 2011/0216069 | A1 | 9/2011 | Keall et al. |
| 2011/0242117 | A1 | 10/2011 | Bolz et al. |
| 2012/0062553 | A1 | 3/2012 | Yang |
| 2012/0096474 | A1 | 4/2012 | Jiao |
| 2012/0223947 | A1* | 9/2012 | Nystad .............. G06T 15/005 345/426 |
| 2013/0113790 | A1* | 5/2013 | Kazakov ............. G06T 15/005 345/419 |
| 2013/0194286 | A1 | 8/2013 | Bourd et al. |
| 2014/0362081 | A1 | 12/2014 | Cerny et al. |
| 2014/0362100 | A1 | 12/2014 | Cerny et al. |
| 2014/0362101 | A1 | 12/2014 | Cerny et al. |
| 2014/0362102 | A1 | 12/2014 | Cerny et al. |

FOREIGN PATENT DOCUMENTS

| | | |
|---|---|---|
| CN | 103020205 A | 4/2013 |
| CN | 102708537 B | 9/2016 |
| EP | 2309460 A1 | 4/2011 |
| JP | 2001195603 A | 7/2001 |
| JP | 2010535393 A | 11/2010 |
| JP | 2012185821 A | 9/2012 |
| WO | 2013036358 A1 | 3/2013 |

OTHER PUBLICATIONS

"OpenGL 4.3 Overview, SIGGRAPH 2012", Sep. 16, 2012, available at: I w I https://www.khronos.org/assets/uploads/developers/library/2OI2-siggraph-opengl-bof/OpenGL-4.3-Overview-SIGGRAPH-AugI2.pdf (pp. 1-36) (last visited: Aug. 29, 2016).

"Stack Overflow: DirectX11: Pass Data from Compute Shader to Vertex Shader", Nov. 2, 2010, available at: http://stackoverflow.com/questions/4049787/directxII-pass-data-from-computeshader-to-vertexshader (last visited: Aug. 29, 2016).

"Tutorial—Compute Shader Filters", Aug. 6, 2012, available at: http://www.codinglabs.net/tutorial~compute~shaders~filters.as(ppxp . 1-11) (last visited: Aug. 29, 2016).

Engel, Wolfgang, Ed. "GPU Pro4 Advanced Rendering Techniques", A K Peters/CRC Press 2013. pp. 21-37.

EP Search Report for EP Application No. 14811318.6, dated Jan. 24, 2017.

Erik Haines et al, "Occlusion Culling algorithms", Excerpted from Real-Time Rendering (AK Peters, 1999).

Final Office Action for U.S. Appl. No. 14/297,201, dated Jan. 24, 2018.

Final Office Action for U.S. Appl. No. 14/297,231, dated Jan. 24, 2018.

Final Office Action for U.S. Appl. No. 14/297,248, dated Apr. 30, 2018.

Final Office Action for U.S. Appl. No. 14/297,248, dated Jun. 1, 2017.

Final Office Action for U.S. Appl. No. 14/297,248, dated Oct. 2, 2017.

Final Office Action for U.S. Appl. No. 14/297,248, dated Mar. 11, 2016.

Final Office Action for U.S. Appl. No. 14/297,290, dated Mar. 20, 2018.

Final Office Action for U.S. Appl. No. 14/297,201, dated Jan. 27, 2017.

Final Office Action for U.S. Appl. No. 14/297,231, dated Jan. 3, 2017.

Final Office Action for U.S. Appl. No. 14/297,248, dated Jan. 20, 2017.

Final Office Action for U.S. Appl. No. 14/297,290, dated Mar. 24, 2017.

International Search Report and Written Opinion for International Application No. PCT/2014/041386, dated Oct. 9, 2014.

International Search Report and Written Opinion for International Application No. PCT/US2014/041382, dated Oct. 9, 2014.

International Search Report and Written Opinion for International Application No. PCT/US2014/041390, dated Oct. 9, 2014.

International Search Report and Written Opinion for International Application No. PCT/US2014041386, dated Dec. 8, 2016.

Japanese Office Action dated Mar. 27, 2018 for Japanese Application No. 2016-518048.

Japanese Office Action for Japanese Application No. 2016-518048, dated Oct. 3, 2017.

Mehta, Prateek. Learn OpenGL ES: For Mobile Game and Graphics Development. Apress, 2013, p. 1-199.

Non-Final Office Action for U.S. Appl. No. 14/297,231, dated Jul. 7, 2017.

Non-Final Office Action for U.S. Appl. No. 14/297,248, dated Jan. 12, 2018.

Non-Final Office Action for U.S. Appl. No. 14/297,201, dated Jul. 6, 2016.

Non-Final Office Action for U.S. Appl. No. 14/297,231, dated Jun. 27, 2016.

Non-Final Office Action for U.S. Appl. No. 14/297,248, dated Nov. 6, 2015.

Non-Final Office Action for U.S. Appl. No. 14/297,248, dated Sep. 8, 2016.

Non-Final Office Action for U.S. Appl. No. 14/297,290, dated Sep. 2, 2016.

Notice of Allowance for U.S. Appl. No. 14/297,231, dated Mar. 17, 2018.

Notice of Allowance for U.S. Appl. No. 14/297,290, dated Aug. 9, 2018.

Office Action dated Mar. 14, 2018 for Chinese patent application No. 201480033281.9.

Office Action dated Jan. 24, 2018 for Chinese Patent Application No. 201480032468.7.

Office Action for Chinese Patent Application No. 201480033091.7, dated Jul. 28, 2017.

Peter N. Glaskowski, "NVIDIA's Fermi: The First Complete GPU Architecture", 2009.

U.S. Appl. No. 14/297,201, to Mark Evan Cerny, filed Jun. 5, 2014.
U.S. Appl. No. 14/297,231, to Mark Evan Cerny, filed Jun. 5, 2014.
U.S. Appl. No. 14/297,248, to Mark Evan Cerny, filed Jun. 5, 2014.
U.S. Appl. No. 14/297,290, to Mark Evan Cerny, filed Jun. 5, 2014.
U.S. Appl. No. 61/833,213, to Mark Cerny, filed Jun. 10, 2013.
U.S. Appl. No. 61/833,218, to Mark Cerny, filed Jun. 10, 2013.
U.S. Appl. No. 61/833,229, to Mark Cerny, filed Jun. 10, 2013.
U.S. Appl. No. 61/833,233, to Mark Cerny, filed Jun. 10, 2013.

Valdetaro, Alexandre et al. "Understanding Shader Model 5.0 with DirectX11." IX Brazilian symposium on computer games and digital entertainment. vol. 1 No. 2 (2010) p. 1-18.

* cited by examiner

FRAGMENT SHADERS PERFORM VERTEX SHADER COMPUTATIONS

CLAIM OF PRIORITY

This Application is a continuation of U.S. patent application Ser. No. 14/297,231, filed Jun. 5, 2014, the entire disclosures of which are incorporated herein by reference. U.S. patent application Ser. No. 14/297,231 claims the priority benefit of commonly-assigned U.S. provisional patent application No. 61/833,218 filed Jun. 10, 2013, the entire disclosures of which are incorporated herein by reference.

FIELD OF THE DISCLOSURE

Aspects of the present disclosure are related to computer graphics. In particular, the present disclosure is related to use of vertex shaders and pixel shaders in a graphics processing unit.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, tablet computers, portable game devices, mobile phones, personal computers, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send commands to the GPU to implement a particular graphics processing task, e.g. render a particular texture that has changed with respect to a previous frame in an image. These draw commands may be coordinated by the CPU with a graphics application interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data in a form suitable for output to a display, and additional rendering tasks on the pixels (or fragments) before outputting the rendered image on the display.

Virtual objects of an image are often described in virtual space in terms of shapes known primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and information that associates particular vertices with particular polygons.

A GPU may perform rendering tasks of the graphics pipeline by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The pipeline may also include other shaders at various stages in the pipeline, such as geometry shaders that use the output of the vertex shaders to generate a new set of primitives (or corresponding primitive information), as well as compute shaders (CS) which may implemented by a GPU to perform certain other general computational tasks.

One challenge associated with processing graphics in the pipeline is that certain bottlenecks may occur and slow down performance as data is input and output to the various shaders in the pipeline. Moreover, it is desirable to provide a developer of a particular application running the visuals with a large amount of control over how shaders utilize various visual parameters and underlying data in order to permit them to optimize the rendering processes.

It is within this context that aspects of the present disclosure arise.

SUMMARY

According to aspects of the present disclosure, a computer graphics processing method may include writing vertex indices output from a vertex shader to a cache; accessing the vertex indices written to the cache with a pixel shader; and accessing vertex parameter values associated with the vertex indices from a memory unit with the pixel shader.

In some implementations of the present disclosure, the computer graphics processing method may include performing vertex shader computations on the vertex parameter values with the pixel shader.

In some implementations, the computer graphics processing method may include interpolating the vertex parameter values with the pixel shader.

In some implementations, accessing the vertex indices may include copying the vertex indices from the cache to a local memory unit of a GPU, and accessing the indices from the local memory unit with the pixel shader.

In some implementations, the vertex shader computations may include manipulating a visual effect of a primitive's vertex in three-dimensional virtual space.

In some implementations, accessing the vertex parameter values may include accessing parameter values of all three vertices of a triangle primitive.

In some implementations, the method may further include, after said accessing the vertex parameter values: performing vertex shader computations on the vertex parameter values with the pixel shader; interpolating the parameter values with the pixel shader; performing pixel shader computations on the interpolated parameter values with the pixel shader In some implementations, the vertex shader output is limited to vertex position and the vertex indices, and the pixel shader may perform any remaining vertex shader computations after said accessing the vertex indices.

In some implementations, the memory unit is a main memory of a system.

In some implementations, the parameter values may be stored in vertex buffers in the main memory.

According to aspects of the present disclosure, a graphics processing system may include: a graphic processing unit (GPU); a memory unit; and a cache; and the system may be configured to implement a graphic processing method that may include: implementing a vertex shader and a pixel shader with the GPU; writing vertex indices output from a vertex shader to the cache; accessing the vertex indices written to the cache with the pixel shader; and accessing vertex parameter values associated with the vertex indices from the memory unit with the pixel shader.

In some implementations, the memory unit may be a main memory unit of the system In some implementations, the GPU may include a plurality of compute units and a plurality of local memory units, wherein each of the local memory units are associated with a respective one of the compute units.

In some implementations, said accessing the vertex indices may include copying the vertex indices from the cache to the local memory units, and accessing the indices from the local memory units with the pixel shader.

In some implementations, the cache may be integrated with the GPU.

According to aspects of the present disclosure, a non-transitory computer readable medium may have computer readable instructions embodied therein, the computer readable instructions being configured to implement a graphics processing method when executed, the graphics processing method including: writing vertex indices output from a vertex shader to a cache; accessing the vertex indices written to the cache with a pixel shader; and accessing vertex parameter values associated with the vertex indices from a memory unit with the pixel shader.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

According to aspects of the present disclosure, a vertex shader output can be reduced to just output position and the vertex index and pixel shaders can perform the remaining vertex shader computations as well as the usual pixel shader computations, which may result in accelerated rendering of objects.

According to aspects of the present disclosure, the pixel shader may access parameter values directly from system memory in order to perform vertex shader computations on the raw parameter values of the vertices. The pixel shader then may then interpolate the parameter values and perform pixel shader computations before the rendered pixels are output from the pixel shader to a frame buffer. Bottlenecks associated with throughput and copying of parameter value may be reduced by outputting vertex indices and not full output parameters from vertex shaders, and using those indices to identify parameter values in memory with the pixel shaders.

Figure 1A:
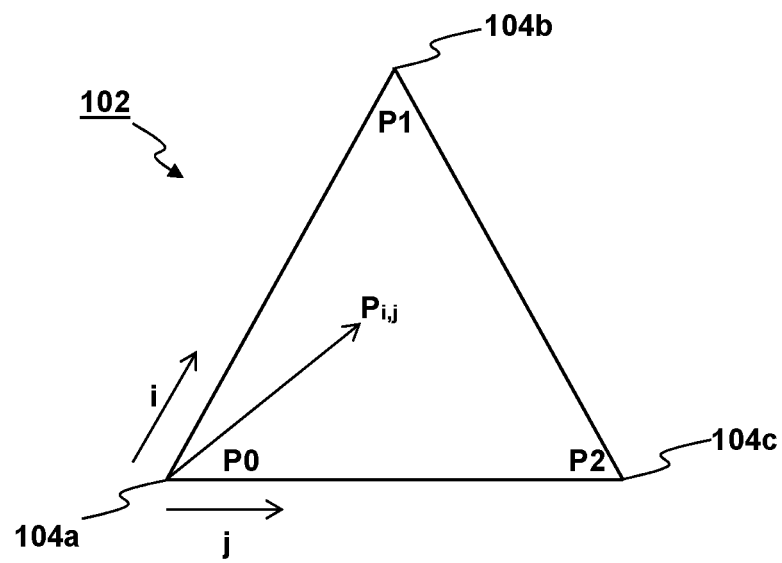
FIGS. 1A-1C are schematic diagrams of triangular primitives illustrative of various graphics processing techniques.
Figure 1B:
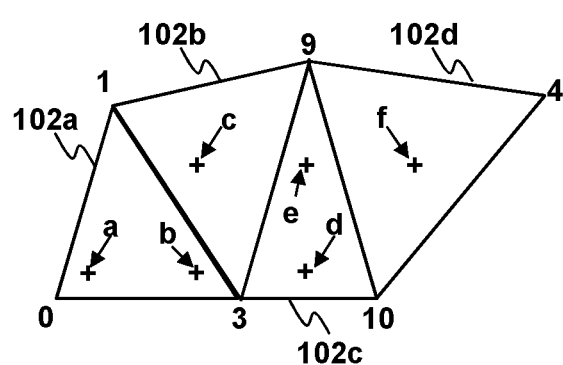
Figure 1C:
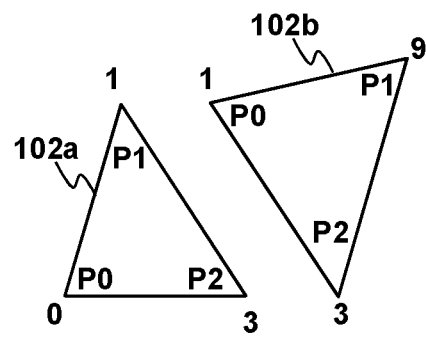

FIGS. 1A-1C illustrate various aspects of graphics processing techniques and how interpolation of vertex parameters may be used to process graphics and render virtual objects in an image. A graphics processing technique may utilize a barycentric interpolation process in order to define parameter values at various locations of the virtual object to be displayed. By way of example, and not by way of limitation, parameter values may be positions, colors, texture coordinates, lighting, and the like at each vertex of a primitive located in virtual space, and barycentric interpolation of these vertex parameters may be used to determine a parameter value at any location within the primitive. For example, any number of pixels may be located within the primitive when used to render a virtual scene on the pixels of the display, and such interpolation of the vertex parameter values may be used to determine the corresponding parameter value at the pixel location within the primitive.

Illustrative aspects of an interpolation process using a barycentric coordinate system are depicted in FIG. 1A. FIG. 1A depicts a polygon (e.g., a triangle) 102 that can be utilized as a primitive for processing graphics with a GPU. It is noted that triangles are commonly used as primitives in graphics processing as they are the two-dimensional shapes with the smallest number of vertices (three), and each triangle is guaranteed to be planar. The surface of a virtual object, such as a three-dimensional object, in an image to be rendered can be comprised of a large number of triangle primitives 102 oriented in virtual space. The triangle 102 may include vertices 104a, 104b, 104c each having certain parameter values P0, P1, P2, respectively.

By interpolating the vertex parameter values P0, P1, P2, a parameter value at any point in the triangle 102 may be defined using a linear relationship between the parameters at the corners of the shape. The coordinates i,j may correspond to the locations of a pixel (or pixel center) when the image having the virtual object is rendered in screen space on a display. Accordingly, this interpolation process may be used to determine the parameter value for any of the pixels located in the primitive 102. In any given triangle 102 of a virtual object, there may be any number of pixel centers located within the triangle. For example, there may be zero, one, ten, or more pixels located within the primitive.

In order to interpolate the vertex parameters at location i,j, one of the vertex parameter values is subtracted out from the parameter values of the other vertices, and these subtracted values are multiplied by each of the barycentric coordinate positions within the triangle 102 corresponding to the desired parameter value's location. This can be expressed mathematically as follows, in which the vertex parameter P0 is subtracted out from the other two vertex parameters P1, P2, and these subtracted values are multiplied by the corresponding coordinate values i,j:

$$P_{i,j}=P0+(P1-P0)i+(P2-P0)j$$

FIG. 1B depicts a plurality of triangles 102a-d similar to triangle 102 of FIG. 1A which may be used to render a virtual object for a graphics processing application. FIG. 1B and the description below is a simplified schematic description in order to illustrate various aspects of how vertex parameter data is utilized and stored when implementing graphics processing techniques.

Each of the triangles 102a-d has three vertices which may each have corresponding parameter values. Moreover, the triangles 102a-d share many common vertices and, as such, many of the parameter values are common to different triangles. Rather than storing the parameter values multiple times so that they are associated with each of the triangles, each vertex may be assigned an identifying index. By way of a simplified example, the vertices shown in FIG. 1B are each assigned the identifying indices 0, 1, 3, 9, 10, 4. These indices and their associated parameter values may be stored in what is commonly known as a "vertex buffer." Moreover, each of the triangles 102a-d may be identified by their corresponding vertex indices, e.g., triangle 102a may be identified by (0,1,3), triangle 102b may be identified by (1,3,9), and so forth, and this information may be stored in what is commonly known as an "index buffer." Accordingly, the common vertex parameter values may be associated with each distinct triangle 102a-d through the respective indices identified in the buffers.

FIG. 1B also depicts a series of pixel locations a-f overlaid over the primitives 102a-d. Interpolation of the parameter values, e.g., as discussed above with reference to FIG. 1A may be used to determine a parameter value at each of the pixel locations a-f within each primitive based on each vertex parameter values and the indices identifying each primitive. By way of example, and not by way of limitation, the triangles 102a-d may be oriented in a three-dimensional virtual environment, and the pixel locations a-f may correspond to the pixels of a two-dimensional screen used to display an image of the rendered virtual environment.

FIG. 1C depicts the triangles 102a and 102b of FIG. 1B in order to illustrate various aspects of how parameter values may be assigned to the pixels a, b, c located within the triangles. As shown in FIG. 1C, the vertex parameter values P0, P1, P2 may be uniquely assigned for each distinct triangle 102a, 102b, and identified based on the indices 0, 1, 3, 9 stored in the index buffer. Interpolation can be performed by access the corresponding parameter values from the vertex buffer and subtracting parameter value P0 from the remaining vertex parameters P1, P2, e.g., as described above with reference to FIG. 1A.

As an alternative to interpolating parameter values of each primitive, a technique known as "flat-shading" may be used. With flat-shading, a "provoking vertex," e.g. P0, may be defined for each triangle and the differences to the remaining vertices, e.g., P1-P0 and P2-P0, are then simply zeroed out.

Any pixels located within the triangle are output from the vertex shader with the parameter value of the provoking vertex. This can save significant overhead associated with the interpolation computations; however, it may result in a faceted look for the virtual object, which may be undesirable in many applications.

Figure 1D:
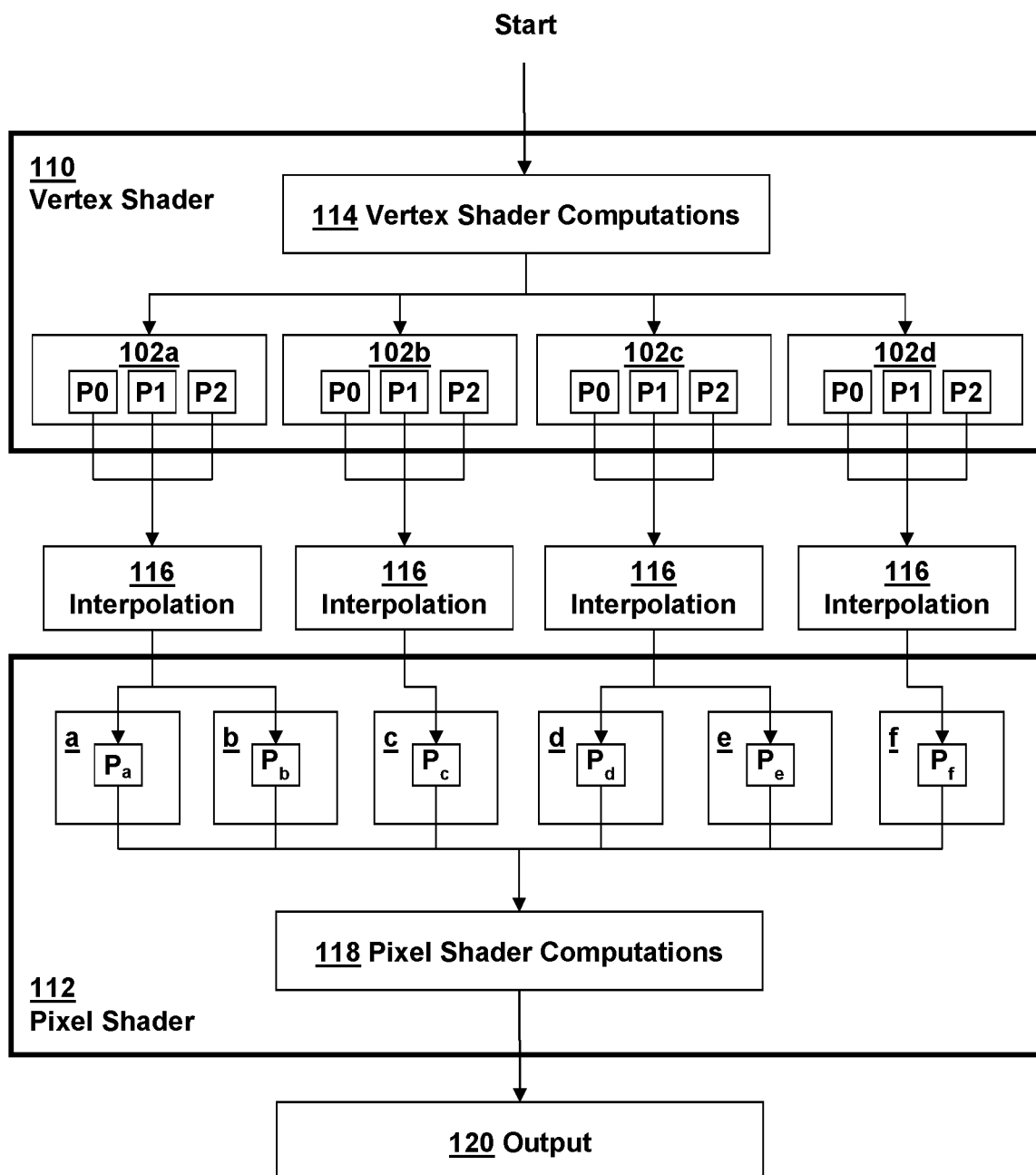
FIGS. 1D-1E are flow diagrams of traditional graphics processing technique.

In FIG. 1D, a flow diagram is depicted illustrative various aspects of performing interpolation of vertex parameters in accordance with one traditional method 100a, whereby the entire interpolation is performed before being received by the pixel shaders. The method 100a of FIG. 1D utilizes the triangles 102a-d as depicted in FIGS. 1B and 1C in order to illustrate how the vertex parameters are interpolated in coordination with vertex shaders 110 and pixel shaders 112 in order to determine parameter values for pixels a-f (it is noted that a-f may be more accurately referred to as fragments or pre-pixels, as further modification may be performed by the pixel shaders before outputting them to a frame buffer, but they are simply referred to herein as pixels for purposes of explanation).

The method 100a may include performing certain vertex shader computations 114 with the vertex shader 110, which may include certain manipulations of the vertex parameters of a virtual object on a per-vertex basis according to draw commands received from a graphics API that coordinates rendered graphics with an application's virtual environment. The vertex shader 110 may output corresponding vertex parameter values P0, P1, P2 for each of the triangles 102a-d as shown in FIG. 1D.

These vertex parameter values P0, P1, P2 are interpolated at 116 for each triangle in order to determine parameter values $P_a$-$P_f$ at pixel locations a-f located within the corresponding triangles 102a-d. Interpolation at 116 includes subtracting out vertex parameter P0 and from the other two vertex parameters P1, P2, multiplying these subtracted values by their corresponding barycentric coordinates, and adding the multiplied values to interpolate the parameters at the pixel locations as defined by the coordinates, e.g., as described with reference to FIG. 1A. In the technique depicted in FIG. 1D, the interpolation 116 is performed entirely by a parameter interpolation hardware component associated with a GPU before the pixel shader program 112 receives the parameter values as an input. The pixel shader 112 may further manipulate each pixel a-f by performing certain pixel shader computations at 118 on each of the pixels a-f, i.e., on a per-pixel basis, resulting in output pixels 120, which may then be stored in a frame buffer and can be output as a rendered image on a display.

Figure 1E:
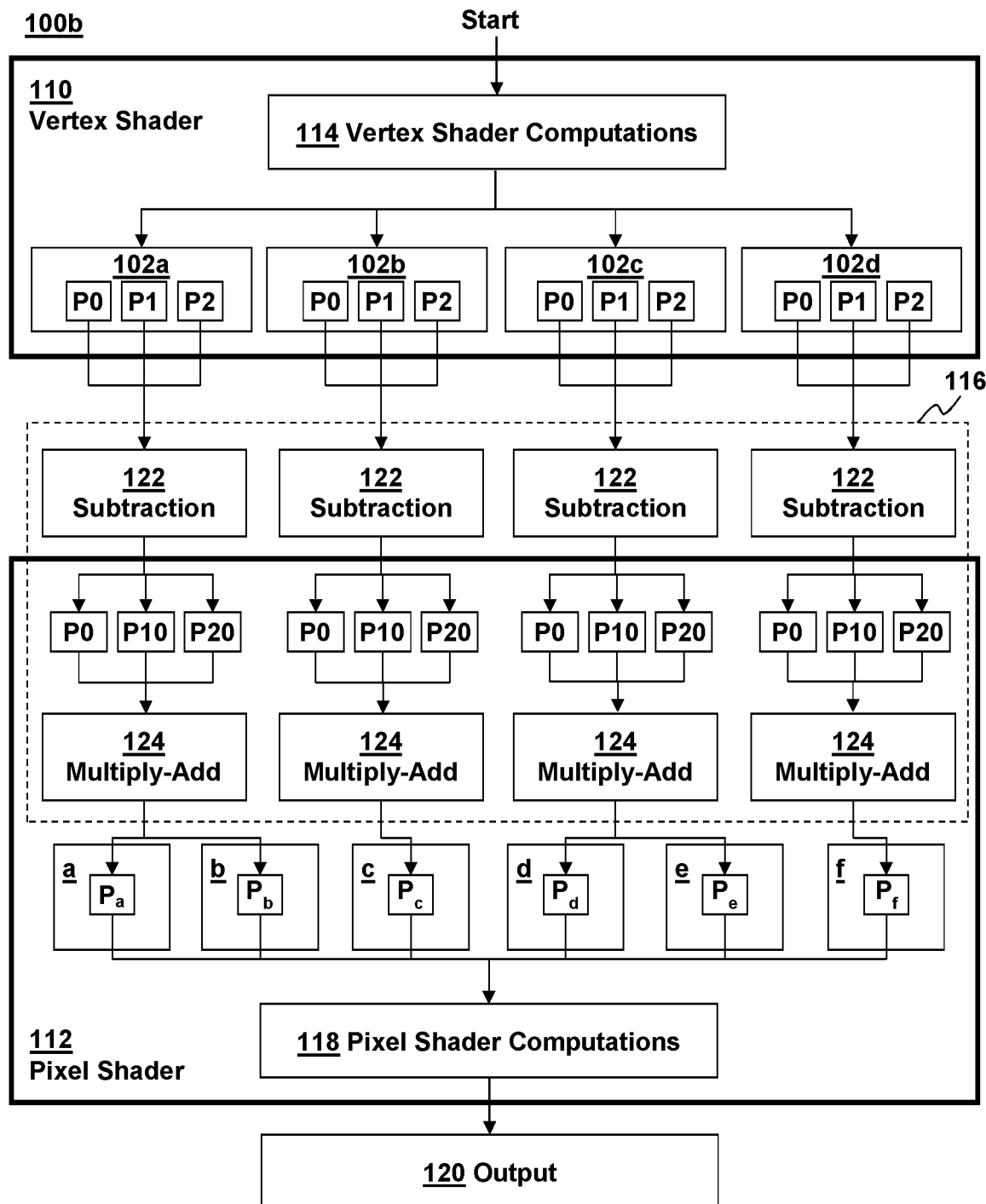

In FIG. 1E, an alternate flow diagram is depicted illustrative various aspects of performing interpolation of vertex parameters in accordance with another traditional method 100b. The traditional method 100b depicted in FIG. 1E is similar to the traditional method 100a of FIG. 1D, except that only the subtraction portion 122 of the interpolation 116 is performed before the parameters reach the pixel shader 112. In this technique 100b, this subtraction portion 122 of the interpolation 116 is performed by a parameter interpolation hardware component associated with a GPU before the pixel shader program 112 receives the subtracted parameter values as an input and performs the remainder of the interpolation 116. Accordingly, the remainder of the interpolation 116 of the vertex parameters can be reduced to a simple multiply and add operation at 124 of the absolute vertex parameter P0, the subtracted parameter values P10, P20 subtracted relative to the parameter P0, and the coordinates of the desired parameter P relative to the absolute vertex parameter P0, whereby P10=P1-P0 and P20=P1-P0 for each of the corresponding triangles 102a-d. This results in the desired parameter values $P_a$-$P_f$ as before, which can then be further manipulated with the pixel shaders at 118 to generate output pixels 120.

Figure 2A:
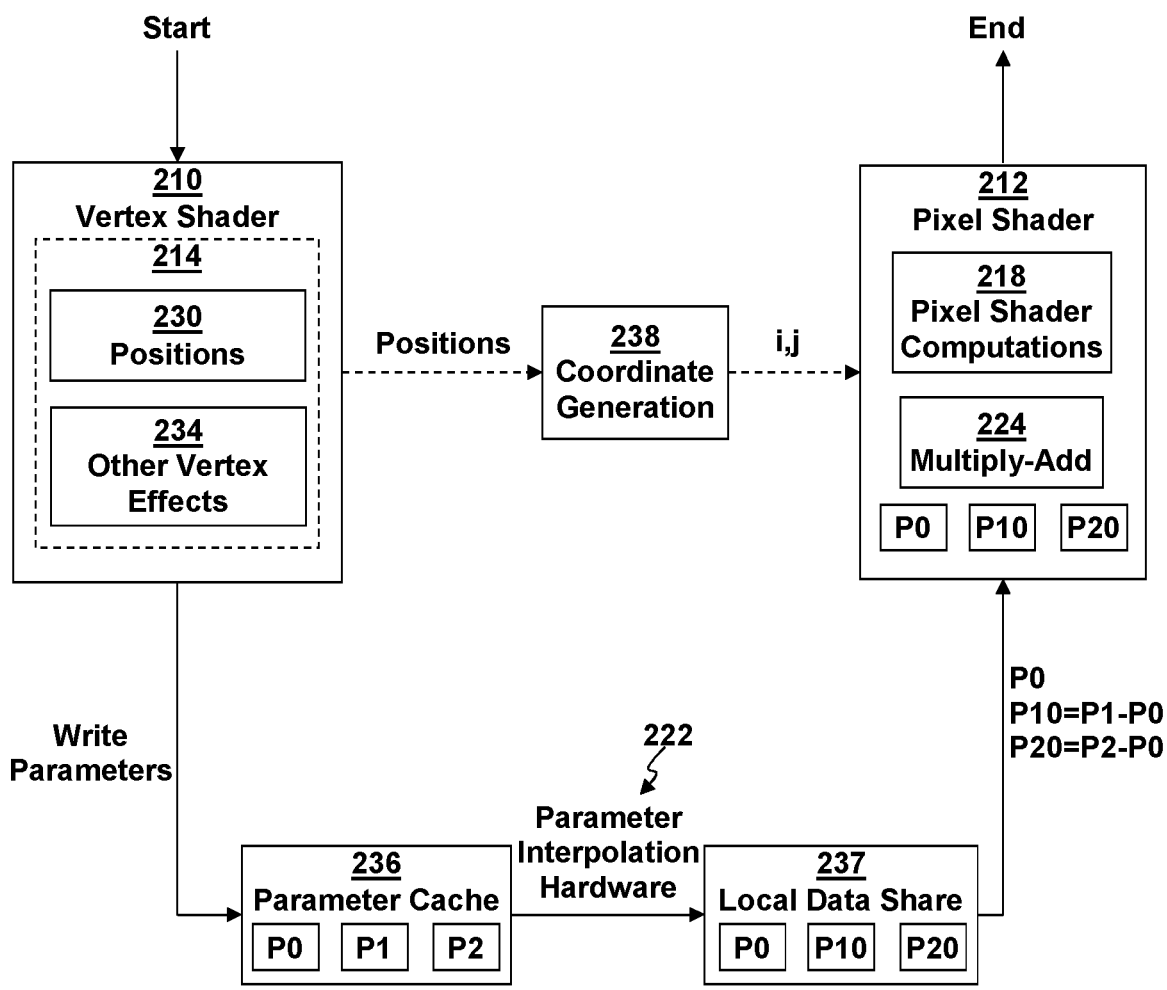
FIG. 2A is a schematic diagram of a traditional graphics processing technique having similarities to the implementation of FIG. 1E.

FIG. 2A depicts a schematic of a method 200a implemented with various hardware and software components configured to process graphics in accordance with a traditional method. The method 200a depicted in FIG. 2A is similar to the method 100b depicted in FIG. 1E.

The vertex shader 210 may perform various vertex shader computations 214 that include determining positions 230 of vertices of the primitives in screen space various other rendering effects 234 on the vertices of each primitive, such manipulating the lighting, shadows, colors, and the like, of the vertices. The various parameters P0, P1, P2 resulting from the vertex shader computations 214 may be written to a parameter cache 236 for temporary storage, and a parameter interpolation hardware component 222 of the system may perform part of the interpolation by subtracting the parameter values before writing respective sets of parameters from the parameter cache 236 to each small local memory unit 237 of each compute unit of a GPU. Each local memory unit 237 may be a small but fast local memory unit sometimes known as a local data share (LDS) associated with each compute unit of a GPU, and there may be a plurality of such memory units and compute units running shader programs in parallel.

The vertex shader output positions 230 may be used by a hardware component 238 that generates barycentric coordinates i,j of pixels relative to each primitive so that they may be used to interpolate parameter values, e.g., as described herein. The pixel shader 212 may access the absolute parameter value P0 and the relative parameter values P10, P20 from the local data share 237 in order to complete the interpolation by performing multiply and add operations 224 using the coordinates of each desired parameter i,j. The pixel shader 212 may then perform certain further pixel shader computations 218 to further manipulate the pixels before outputting them, e.g., to a frame buffer.

One drawback with the technique 200a described above is that certain bottlenecks associated with throughput of the parameters to the pixel shaders may occur, which may slow down the speed of rendering virtual objects. For one, it has been recognized that the parameter write throughput to the parameter cache results in bottlenecks. For example, each parameter may be a large attribute variable, such as, e.g., a 32-bit floating point number, and the vertex shader may write these attribute variables to the parameter cache 236 as a series of wavefronts, e.g., 4 at a time. Moreover, the parameter cache usage may further limit the number of vertex shader wavefronts that may be stored, creating additional bottlenecks. The parameters are then copied to the local data share 237 and temporarily stored before being accessed by the pixel shaders, and the limited throughput and total local data share usage can again create bottlenecks by limiting the number of pixel shader wavefronts.

Another drawback with the technique 200a described above is that, because the subtracted parameter values P10, P20 are calculated before reaching the pixel shader 212, the pixel shaders do not have direct access to the raw parameter values P1, P2, thereby limiting the types of rendering effects that can be performed with the pixel shaders.

Implementations

Figure 2B:
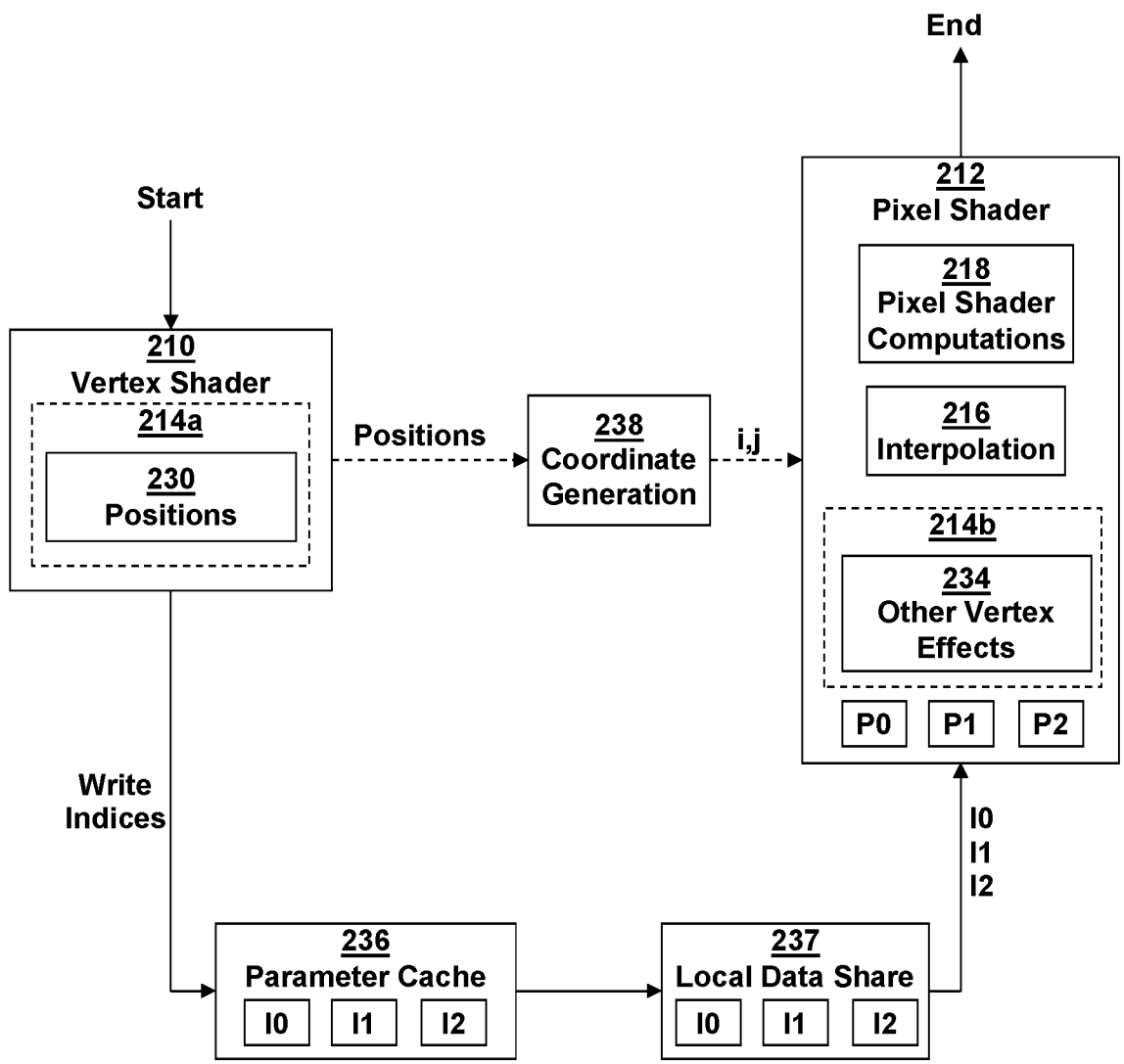
FIG. 2B is schematic diagram of a graphics processing technique in accordance with aspects of the present disclosure.

FIG. 2B illustrates an implementation of an aspect of the present disclosure. FIG. 2B depicts a schematic of a technique 200b implemented with various hardware and software components configured to process graphics according to various aspects of the present disclosure. In the implementation depicted in FIG. 2B, bottlenecks associated with the through put of parameter values, e.g. as described above, can be addressed by providing the pixel shaders with direct access to the vertex parameter values. The pixel shaders may then perform many computations on these raw vertex parameter values traditionally associated with vertex shaders, as well as interpolation of the vertex parameters before performing the usual pixel shader computations.

As shown in FIG. 2B, the vertex shader 210 performs vertex shader computations as indicated at 214a. In some cases, these computations may be limited to determining vertex positions 230 and outputting indices so that other parameter values may be omitted from the vertex shader output. Rather than write vertex shader output parameters to the parameter cache 236, the vertex shader 210 can be configured to only write vertex indices I0, I1, I0 identifying each primitive (e.g., triangle or other polygon) to the parameter cache 236. These indices may than be sent to the local data share 237 so that the pixel shaders may access them locally. Having access to these indices I0, I1, I2, the pixel shader 212 may then access the raw parameter values P0, P1, P2 associated with the indices directly from main memory of the system, e.g., from the vertex buffers. Having access to these parameter values, the pixel shader 212 may then perform the remaining vertex shader computations 214b, which may include other visual effects 234 on the vertices of the triangles. The pixel shader may then use the coordinates i,j to perform interpolation 216 of parameter values resulting from the remaining vertex shader computations 214b in order to determine the parameter values at each pixel location. The pixel shader 212 may then perform further pixel shader computations 218 on the interpolated values, which may include further visual effects on the pixels, to generate output pixels.

In this illustrative implementation, since the indices I0, I1, I2 transmitted through to the pixel shaders are much smaller amounts of data than the attribute variables used for the parameter values, e.g., indices are essentially only one number, bottlenecks associated with the throughput of these parameter values may be decreased.

It is noted, however, that having pixel shader 212 perform vertex shader computations 214b and interpolation 216 in the manner depicted in FIG. 2B may increase the computational load on the pixel shaders as well as the overall shaders. For example, it is noted that there are usually many more pixels than there are visible vertices in an image. Because the vertex shader computations 214b are performed by the pixel shaders 212 instead of the vertex shaders 210 in the illustrated method, rather than performing them once per vertex, as would be done by the vertex shaders, they may be performed three times per pixel (i.e., for each vertex of the triangle primitive containing the pixel). Accordingly, increasing the computational load in this manner may be contrary to conventional wisdom, which would dictate that increasing a computational load would slow down performance and be undesirable. However, because bottlenecks associated with parameter throughput may be a bigger limiting factor than rendering speed, overall performance may actually be increased and rendering of objects may be accelerated even though more computations may have to be performed by the pixel shader.

It is further noted that with a traditional flat-shading technique, e.g., as mention above, the pixel shader would not be able to directly access all of the indices and all of the vertex parameters for each triangle. At best it would only be able to access the provoking vertex, limiting the rendering that can be performed and the type of visual effects that can be produced, such as, e.g., preventing the pixel shader from performing the vertex shader computations 214b as shown in FIG. 2B.

Figure 3:
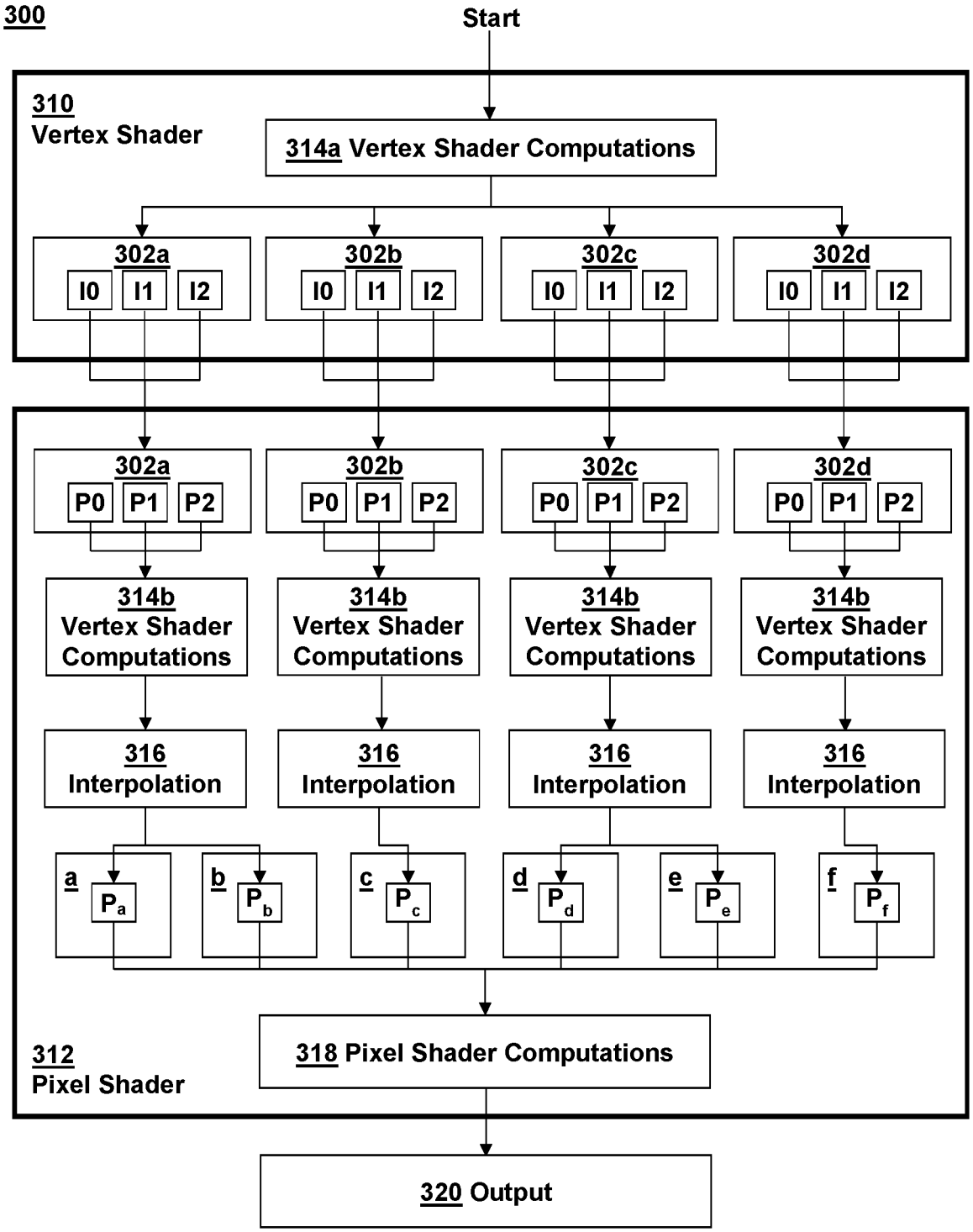
FIG. 3 is a flow diagram of a graphics processing technique in accordance with aspects of the present disclosure.

FIG. 3 depicts a flow diagram of a method 300 for processing graphics with vertex shaders and pixel shaders according to various aspects of the present disclosure. The method 300 has similarities to the graphics processing technique 200b depicted in FIG. 2B.

The illustrated method 300 includes performing vertex shader computations 314a with a vertex shader 310. Many usual vertex shader computations can be omitted the computations 314a performed by the vertex shader 310 and can be instead performed on a per-pixel bases with the pixel shader 312. The output of the vertex shader 310 can be limited to vertex output position and vertex indices for each of the primitives 302a-d. The primitives may be triangles that each have three vertices identified by the indices I0, I1, I2, and may be similar to the triangles 102a-d depicted in FIG. 1B.

The indices may be sent to the pixel shaders 312, which can then use the indices I0, I1, I2 to directly access each of the vertex parameter values P0, P1, P2 for each of the different primitives 302a-d. The pixel shader 312 may directly access the raw parameter values, for example, by directly accessing system memory having the parameter values stored in a vertex buffer associated with the vertex indices. The pixel shader may use the parameter values to perform the remaining vertex shader computations 314b, which may include rendering certain visual effects on each vertex of each primitive. The pixel shader 312 may then interpolate the resulting parameter values after performing the vertex shader computations 314b in order to extract the parameter $P_a$-$P_f$ at each pixel location within the primitive. The pixel shader 312 may then produce additional visual effects on the pixels by performing pixel shader computations 318 on the pixels with interpolated parameter values, and may output the rendered pixels 320, e.g., to a frame buffer in system memory.

Figure 4:
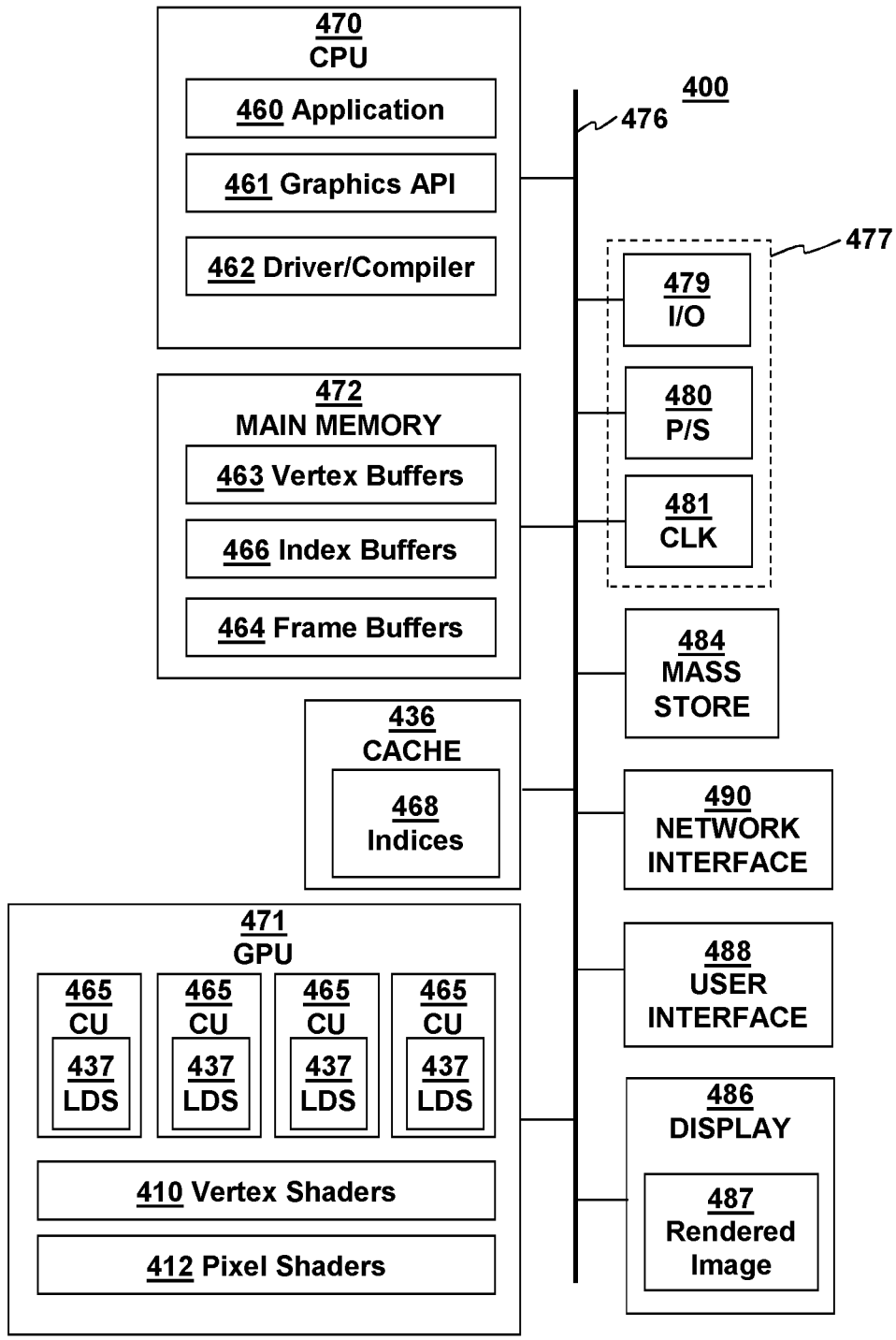
FIG. 4 is a schematic diagram of a system for implementing graphics processing techniques in accordance with aspects of the present disclosure.

Aspects of the present disclosure include graphics processing systems that are configured to implement the features discussed above. By way of example, and not by way of limitation, FIG. 4 illustrates a block diagram of a computer system 400 that may be used to implement graphics processing according to aspects of the present disclosure. According to aspects of the present disclosure, the system 400 may be an embedded system, mobile phone, personal computer, tablet computer, portable game device, workstation, game console, and the like.

The system 400 generally may include a central processor unit (CPU) 470, a graphics processor unit (GPU) 471, and a main memory 472 that is accessible to both the CPU and GPU. The CPU 470 and GPU 471 may each include one or more processor cores, e.g., a single core, two cores, four cores, eight cores, or more. The main memory 472 may be in the form of an integrated circuit that provides addressable memory, e.g., RAM, DRAM, and the like.

By way of example, and not by way of limitation, the CPU 470 and GPU 471 may access the main memory 472 using a data bus 476. In some cases, it may be useful for the system 400 to include two or more different buses. The main memory 472 may contain data that can be accessed by the CPU 470 and GPU 472. The main memory may temporarily store buffers of data which include vertex buffers 463, index buffers 466, and frame buffers 464.

The CPU may be configured to execute CPU code, which may include an application 460 utilizing rendered graphics, a driver/compiler 461 and graphics API 462 for issuing draw commands to programs implemented by the GPU. The CPU code may also implement physics simulations and other functions. The GPU may be configured to operate as discussed above with respect illustrative implementations of the present disclosure. In particular, the GPU may execute GPU code, which may implement vertex shaders 410 and pixel shaders 412, as discussed above. The shaders may interface with data in the main memory 472 and the pixel shaders may output rendered pixels in the frame buffer 464 for temporary storage before being output to a display. The GPU may include a plurality of compute units (CU) 465 configured to perform graphics processing tasks in parallel. Each compute unit may include its own dedicated local memory store, such as a local data share (LDS) 437 described above. The system 400 may also include a cache 436 for temporarily storing vertex index data 468, and data may be copied from the cache 436 to each LDS 437, which may then implement shader programs that utilize the data in parallel. The parameter cache 436 may be integrated with the GPU, or may be distinct from the GPU and accessible to the GPU, e.g., via the bus 476. The GPU may also execute other programs, such as, e.g., geometry shaders and compute shaders.

The system 400 may also include well-known support functions 477, which may communicate with other components of the system, e.g., via the bus 476. Such support functions may include, but are not limited to, input/output (I/O) elements 479, power supplies (P/S) 480, and a clock (CLK) 481.

The apparatus 400 may optionally include a mass storage device 484 such as a disk drive, CD-ROM drive, flash memory, tape drive, or the like to store programs and/or data. The device 400 may also include a display unit 486 and user interface unit 488 to facilitate interaction between the apparatus 400 and a user. The display unit 486 may be in the form of a flat panel display, cathode ray tube (CRT) screen, touch screen, or other device that can display text, numerals, graphical symbols or images. The display 486 may display rendered images 487 processed in accordance with various techniques described herein. The user interface 488 may include a keyboard, mouse, joystick, light pen, game controller, or other device that may be used in conjunction with a graphical user interface (GUI). The system 400 may also include a network interface 490 to enable the device to communicate with other devices over a network. The network may be, e.g., a local area network (LAN), a wide area network such as the internet, a personal area network, such as a Bluetooth network or other type of network. These components may be implemented in hardware, software, or firmware, or some combination of two or more of these.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer graphics processing method comprising:
writing vertex indices output from a vertex shader to a cache;
accessing the vertex indices written to the cache with a pixel shader; and
accessing raw vertex parameter values associated with the vertex indices from a memory unit with the pixel shader, wherein the raw vertex parameter values have not been processed by the vertex shader; and
performing vertex shader computations on the raw vertex parameter values with the pixel shader on a per-pixel basis, wherein the vertex shader computations are performed on a pixel for each vertex of a primitive containing the pixel.

2. The method of claim 1, wherein the vertex shader computations include manipulating a visual effect of a primitive's vertex in three-dimensional virtual space.

3. The method of claim 1, further comprising interpolating the raw vertex parameter values with the pixel shader.

4. The method of claim 1, wherein said accessing the vertex indices includes copying the vertex indices from the cache to a local memory unit of a GPU, and accessing the indices from the local memory unit with the pixel shader.

5. The method of claim 1, wherein accessing the vertex parameter values includes accessing parameter values of all three vertices of a triangle primitive.

6. The method of claim 1, further comprising, after said accessing the vertex parameter values:
performing vertex shader computations on the vertex parameter values with the pixel shader;
interpolating the parameter values with the pixel shader;
performing pixel shader computations on the interpolated parameter values with the pixel shader.

7. The method of claim 1, wherein the vertex shader output is limited to vertex position and the vertex indices, and wherein the pixel shader performs any remaining vertex shader computations after said accessing the vertex indices.

8. The method of claim 1, wherein the parameter values are stored in vertex buffers in the memory unit.

9. A graphics processing system comprising:
a graphic processing unit (GPU);
a memory unit; and
a cache;
wherein the system is configured to implement a graphic processing method, the method comprising:
implementing a vertex shader and a pixel shader with the GPU;
writing vertex indices output from a vertex shader to the cache;
accessing the vertex indices written to the cache with the pixel shader;
accessing vertex parameter values associated with the vertex indices from the memory unit with the pixel shader, wherein the raw vertex parameter values have not been processed by the vertex shader; and
performing vertex shader computations on the raw vertex parameter values with the pixel shader on a per-pixel basis, wherein the vertex shader computations are performed on a pixel for each vertex of a primitive containing the pixel.

10. The system of claim 9, wherein the GPU comprises a plurality of compute units and a plurality of local memory units, wherein each of the local memory units are associated with a respective one of the compute units.

11. The system of claim 10, wherein said accessing the vertex indices includes copying the vertex indices from the cache to the local memory units, and accessing the indices from the local memory units with the pixel shader.

12. The system of claim 9, wherein the cache is integrated with the GPU.

13. The system of claim 9, wherein the method further comprises performing vertex shader computations on the vertex parameter values with the pixel shader.

14. The system of claim 9, wherein the method further comprises interpolating the vertex parameter values with the pixel shader.

15. The system of claim, 9, wherein the system is an embedded system, mobile phone, personal computer, tablet computer, portable game device, workstation, or game console.

16. A non-transitory computer readable medium having computer readable instructions embodied therein, the computer readable instructions being configured to implement a graphics processing method when executed, the graphics processing method comprising:
writing vertex indices output from a vertex shader to a cache;
accessing the vertex indices written to the cache with a pixel shader; and
accessing raw vertex parameter values associated with the vertex indices from a memory unit with the pixel shader, wherein the raw vertex parameter values have not been processed by the vertex shader; and
performing vertex shader computations on the raw vertex parameter values with the pixel shader on a per-pixel basis, wherein the vertex shader computations are performed on a pixel for each vertex of a primitive containing the pixel.

* * * * *